Patented Jan. 12, 1943

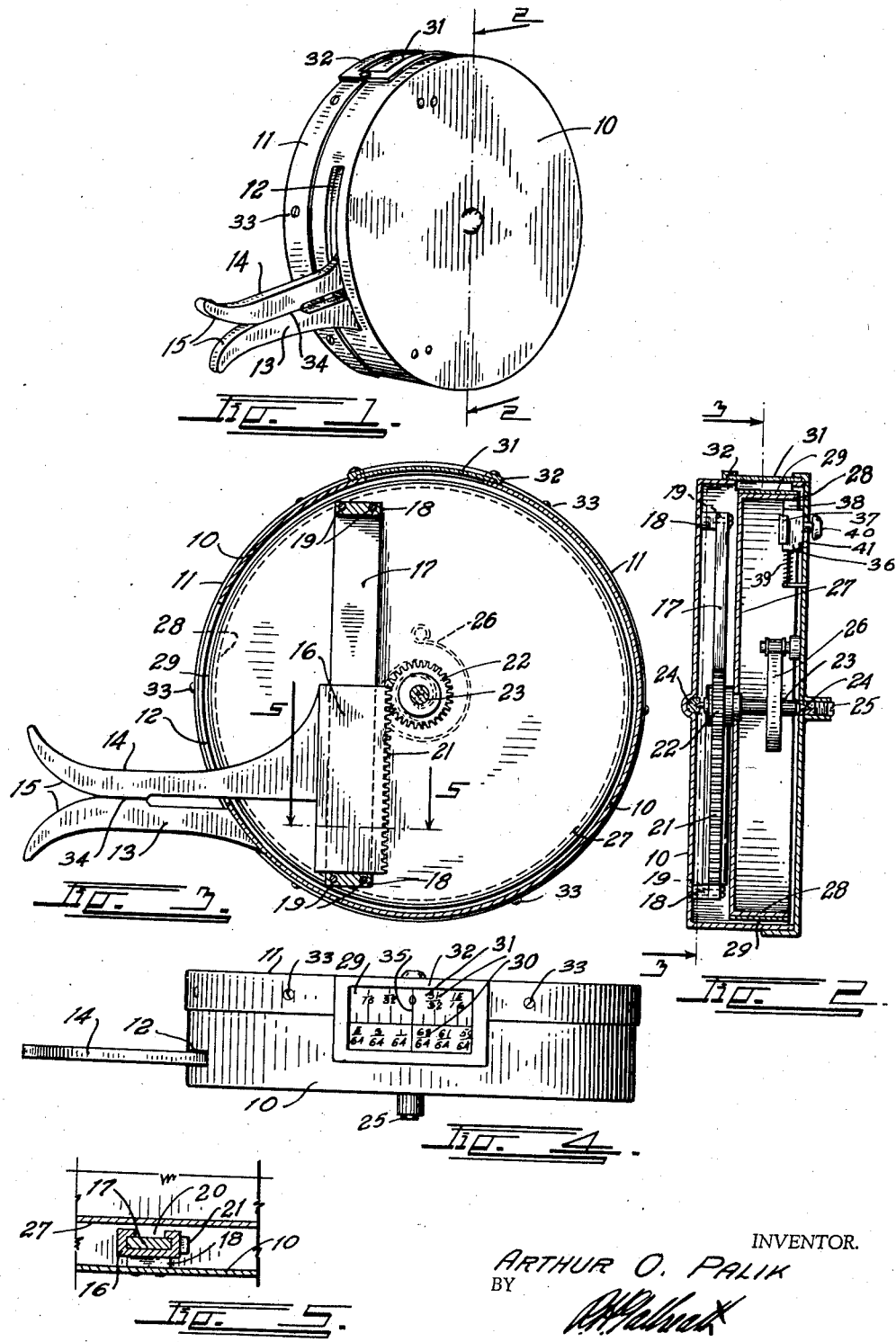

2,307,945

UNITED STATES PATENT OFFICE 2,307,945

QUICK READING CALIPER

Arthur O. Palik, Denver, Colo.

Application May 20, 1941, Serial No. 394,259

1 Claim. (Cl. 33—147)

This invention relates to a direct reading micrometer or caliper and has for its principal object the provision of a device of this character which can be used to measure the diameter or thickness of any article within its capacity by simply slipping the article into the device, thus eliminating all mechanical manipulation.

Another object of the invention is to provide a device of this character which will give a direct reading on a singel scale of the diameters or thicknesses of the given article without requiring computations or combinations of various scales.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of the improved caliper;

Fig. 2 is an enlarged cross section therethrough, taken on the line 2—2, Fig. 1;

Fig. 3 is a longitudinal section, taken on the line 3—3, of Fig. 2;

Fig. 4 is a top view thereof; and

Fig. 5 is a detail section, taken on the line 5—5, Fig. 3.

The improved caliper employs a drum-shaped housing 10, closed at one side and open at the other. The open side is closed by means of a circular flanged lid member 11 to form a complete drum-shaped container. The lid member may be secured in place by means of suitable screws 33. One side of the housing 10 is provided with a circumferential slot 12 through which a movable jaw 14 projects. A fixed jaw 13 is secured to the housing below the slot 12 in any suitable manner.

The extremities of the two jaws are flared outwardly, as illustrated, to form inclined surfaces 15 between which the article to be measured is forced to separate the jaws. The two jaws contact along accurately aligned contact surfaces 34 between which the measurements are taken.

The movable jaw 14 terminates within the housing in a slide member 16 which is slidably mounted on a slide bar 17. The slide bar is supported in any suitable manner from the inner face of the housing 10, such as by means of separating blocks 18 and screws 19.

One side of the slide member 16 is open, as shown at 20, to allow a milling tool to be inserted so that the contacting surfaces between the bar 17 and the slide member can be accurately milled or ground. It is essential that there be no side play in this sliding fit.

The inner edge of the slide member 16 is provided with rack teeth 21 which are in constant mesh with the teeth of a pinion gear 22. The gear 22 is mounted on a shaft 23 concentrically positioned within the housing 10. The extremities of this shaft are journalled in jeweled bearings 24, one of which is adjustable by means of a bearing screw 25 so that all lost motion in the shaft may be removed. The shaft is constantly urged to rotate in one direction by means of a coil spring 26 and is rotated in the other direction, through the medium of the rack teeth 21, when the jaws are separated.

A scale drum 27 is fixedly secured on the shaft adjacent the pinion 22. This drum is surrounded by a peripheral flange 28 spaced closely adjacent the inner wall of the housing 10.

An index scale 29 surrounds the flange 28 and contains suitable measurement indications 30. The scale is visible through a window 31 positioned at the top of the housing 10 and held in place by means of a suitable frame 32.

The relative diameters between the pinion 22 and the scale drum 27 can be made in any desired ratio. The preferred ratio is 8 to 1, that is, the diameter of the scale drum is eight times the pitch diameter of the pinion 22 so that all measurements will be magnified eight times. For instance, let us assume that an article measuring ⅛ of an inch in thickness is placed between the two contact surfaces 34 of the jaws. This will rotate the scale drum a peripheral distance of ½ inch so that exceedingly fine measurements may be made without unduly crowding the measurement marks on the index scale 29.

The operation and action of the device is believed to be clearly understood from the description and drawing.

Briefly, the jaws are simply pushed against the article to be calipered. The article slides between the jaws and separates them until the contact surfaces 34 are resting on the portion to be measured. The operator then reads the measurement directly on the scale 29 by means of a marking line or scratch 35 on the window 31.

For some uses, it is desirable to prevent return rotation of the scale drum after the measurement has been taken so that a reading may be had after the instrument has been removed from the work. For such uses, a brake member 36 is mounted in a guide 37 within the cover 11. The brake member is fitted with any suitable friction facing 38, such as leather or the like. A spring 39 constantly urges the friction facing against the inner face of the flange 28 to prevent rotation of the shaft 23. The brake member may be moved out of contact by means of a finger button 40 on the exterior of the lid member 11. The finger button is, of course, connected to the brake member through a slotted hole 41. With this attachment in place, the operator slides the finger button 40 with his thumb until the jaws are in place on the article to be measured, he then releases the button to hold the measurement in place until the reading has been taken.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A caliper comprising: a drum-like, circular housing having a closed face, a circumferential wall, and an open side; a cover closing the open side; a shaft extending between the cover and the closed face concentric of the housing; an annular cylindrical flange supported from said shaft and revolving closely adjacent the inner wall of said housing; a fixed jaw member projecting from the wall of said housing; a movable jaw member projecting through a slot in the wall of said housing parallel with the fixed jaw member; a guide member within said housing; a slide member sliding on the guide member; means interconnecting said shaft and said slide member so that movements of the latter will rotate said shaft; a spring resisting the movements of said shaft; a friction brake member within the periphery of said flange; spring means urging said brake member outwardly against said flange to hold the latter in any desired position; and brake releasing means extending through the cover of said brake member.

ARTHUR O. PALIK.